(12) United States Patent
Sarussi

(10) Patent No.: US 6,252,241 B1
(45) Date of Patent: Jun. 26, 2001

(54) ROTATIONAL SCANNING IMAGE RECORDING SYSTEM HAVING BOTH A LARGE FORMAT AND HIGH RESOLUTION

(75) Inventor: Rafi Sarussi, Koachav Hashachar (IL)

(73) Assignee: Creo, Ltd., Lod (IL)

( * ) Notice: Subject to any disclaimer, the term of this patent is extended or adjusted under 35 U.S.C. 154(b) by 0 days.

(21) Appl. No.: 09/221,896

(22) Filed: Dec. 28, 1998

(51) Int. Cl.$^7$ .................................................. G01N 21/00
(52) U.S. Cl. ........................ 250/559.4; 250/234; 348/87
(58) Field of Search ................................. 250/234, 235, 250/236, 559.4, 570, 208.1, 216, 221; 358/296, 300, 302, 472, 474; 355/68, 85, 89; 399/211, 213; 348/86, 87, 125, 126

(56) References Cited

U.S. PATENT DOCUMENTS

| | | | |
|---|---|---|---|
| 3,155,505 | 11/1964 | Shannon | 96/27 |
| 4,110,594 | 8/1978 | May | 219/121 LM |
| 4,316,074 | 2/1982 | Daly | 219/121 L |
| 4,387,452 | 6/1983 | Bricot et al. | 369/32 |
| 5,291,315 | 3/1994 | Hosoe | 359/3 |

FOREIGN PATENT DOCUMENTS

| | | | |
|---|---|---|---|
| 0337812 | 4/1988 | (EP) | G03B/27/47 |
| 59-192498 | 9/1984 | (JP) | G02B/26/10 |

*Primary Examiner*—John R. Lee
*Assistant Examiner*—Kevin Pyo

(57) ABSTRACT

Images are scanned onto photosensitive media in many different technical fields such as printing plate imaging, printed circuit board manufacture and other product areas. It is important to minimize the time involved in generating high resolution images on relatively large surface areas. The present system allows for both high imaging speeds and high resolution.

15 Claims, 6 Drawing Sheets

ROTATIONAL SCANNING IMAGE RECORDING SYSTEM HAVING BOTH A LARGE FORMAT AND HIGH RESOLUTION

BACKGROUND OF THE INVENTION

1. Field of the Invention

The present invention relates to the field of image scanning, particularly scanning of images by coherent radiation, particularly essentially monochromatic coherent radiation and more particularly optical scanning of images with a mechanical system. The invention relates to such optical/mechanical scanning systems which provide sufficiently high resolution as to enable the scanned image to be used in photolithographic manufacture of printed circuit boards (PCB) and printing plates.

2. Background of the Art

Optical scanning techniques have found important applications in many technical fields. These fields include, for example, laser printers for computers; laser direct writing lithography for production of masks, wafers and optical integrated circuits; high speed photography; IR imaging; image information transmission; thermal and mass transfer of images; graphic arts imaging for newspapers and other printed materials; direct imaging for printed circuit board fabrication; and the like. Many different scanning technologies, software, hardware and qualities are available commercially and in the literature. A summary of scanning methods is presented in the articles by Leo Beiser (*Laser Focus/Electro-Optics,* Feb. 1985) and Henry E. R. Lassiter (*Laser Focus World,* Jan. 1991).

A significant challenge in the generation of scanned data particularly occurs with respect to the provision of large format image recording systems. One aspect of the technical problems faced in producing high resolution image data within the large format field is the technically contradictory objectives to record a large image area, yet use the smallest possible pixel size in the generated data while still providing the data in the shortest time or at least a reasonable time. The issues tend to be contradictory as it takes more data and more time to provide image data when using small pixels. When working with a fixed or standard large area format image, the greater the resolution, longer exposure times are needed to generate the data with high resolution. For example, with a typical plate size in Printed Circuit Board applications of 20" by 24" (50.8 cm×61 cm), the total number of binary pixels is about 256×10$^6$ pixels for 5080 (2000 dots per centimeter) dot per inch resolution. If this image were to be recorded in 1 minute, it would require a sustained data generation rate of about 0.5 Gbit/sec. Such high rates and high resolution in scanned data systems pose a significant challenge to imaging systems that are presently under development or recently available, and these high rates and high resolutions have not yet been met satisfactorily with commercial equipment.

Existing optical scanning systems tend to be limited in data rate acquisition by mechanical speed limitations, light switching speed limitations or both. For example, X-Y stage-based scanning systems have relatively low imaging rates which are limited by the low translation speed of the stages. External or internal drum scanning systems, on the other hand, may achieve medium to high imaging speed rates, but are limited to exposing flexible materials because of the physical construction of the system. Images on non-flexible surfaces must be converted to a flexible surface if the images are to be used on a drum system. This conversion to an intermediate image for use on the drum system is itself likely to reduce the ultimate resolution of the final image by introduction of errors in the formation of the intermediate image. Even when software is used to compensate for variations in image data received on a curved or drum surface, there will still be some additional loss of resolution from the process. Serial scanning systems, i.e., systems in which a single channel is used throughout the data path and light modulating to record an image, are limited by their light switching speed, since they require a light modulation switching speed which is the same as the incoming data rate.

Furthermore, polygon based scanning systems in which the scanning trace is a straight line (or any other type of scanning system having a single channel, a serial scanning system) are limited in format size, since the entire area of the format must be covered by the scanning field of view. When an angular or deflected scanning beam is used to attempt to cover a wider area than would be provided by a non-varying straight line polygon scanning system, additional resolution issues are introduced into the data acquisition system. A common compromise in such systems is to make a trade off between the spot size for field of view and writing energy. U.S. Pat. No. 5,216,247 (Wang et al) is a representative example of such tradeoff. It offers relatively high speed scanning and a potential for relatively higher resolution.

Unfortunately, such an optical scanning system, by its very nature, needs to work with a very low numerical aperture, severely limiting the spot size used and the exposure energy capability of the system. For an image format of 22 inches by 28 inches (55.9 cm×71.1 cm), circles as large as 60 inches (152.4 cm) need to be scanned to avoid scan line distortion. For this, a minimum working distance of 30 inches (76.2 cm) would be required to keep the field of view below 90 degrees. This working distance makes the achievement of a numerical aperture (NA) above 0.2 very complex and expensive. This limitation on the NA also limits the spot size. Additionally, this prior art is still limited by light switching speed. It is a serial scanner by its nature and construction, and it must be switched by a single light switch that would need to possess the switching speed of the system or, in other words, the data rate. As previously mentioned, this is a significant issue in the development of a commercially viable system.

The same type of limitation exists in linear scanning systems, which are built around a flatbed substrate carrier. Although flatbed scanners may feature perfectly orthogonal scanning systems, such systems must also compromise between the numerical aperture (and, hence, spot size and exposure energy) and the speed desired for large format imaging. In one type of implementation, where the scan covers part of the image, the imaging speed is limited by the x-y stage direction change. This forces the use of a low NA, large spot and low exposure energy density.

Another limitation associated with existing rotational scanning systems, such as shown in FIG. 3, is the inherent distortion associated with the rotational scanning method. In such systems, an exposure head is rotated at the same time that the working plane is translated linearly to facilitate complete coverage of the image. This mode of scanning can result in incomplete overlap of consecutive swaths of the exposure head, as shown in FIG. 4, unless the linear movement is so incremental as to force the scans to overlap. This, however, directly increases the time needed to scan a given area since the number of scans along the line of linear movement must be increased. As shown in FIG. 4, the scan pattern transcribes, in a single pass, concentric outer radius R1 and inner radius R2. A subsequent scan transcribes the same pattern, but is linearly offset by the translation of the stage. It is apparent that the two consecutive scans may not perfectly overlap, as they are not concentric. It is impossible to compensate for such lack of overlap unless the incremental distance of movement between each scan is significantly less than the width of the scanning spot, resulting in image distortion.

A review of rotational scanning systems recording image on planar surface is given in U.S. Pat. No. 5,216,247 by Wang et al.

Various scanner systems known in the literature include the following, such as U.S. Pat. No. 3,588,218 which describes a multiple spot scanner with an optical relay system in which at least one optical beam is periodically refocused to define a plurality of scanning light spots along a common scan locus. This system uses a drum as the scan locus in which the focused beam forming the spots is returned to a rotating drum after each spot formation.

U.S. Pat. No. 4,301,374 describes a shutter system for an optical multi-lens scanner. The readout uses a laser light source and focusing optics to direct the light onto the data record for modulation and subsequent readout of the modulated light. The shutter elements are interposed to intercept the transmission of light in response to control signals in the data. As can be seen in FIG. 1, the locus of lens travel is arcuate.

U.S. Pat. No. 3,704,372 describes an optical pattern line/edge tracer which uses a motor driven mirror to produce a rotary scan. A mirror assembly is exchangeable to provide varying scan diameters. Reference signals are sampled instantaneously to produce coordinate drive signals. The tracing apparatus appears to be limited to scanning systems arranged to scan a circular path on a surface bearing an image. The mirror is rotated by a motor causes a photocell to effectively scan a surface in a circular path.

U.S. Pat. No. 4,413,180 describes an apparatus and method for image acquisition in which a conical beam of light is generated by impinging a light beam on a surface of a concave, cylindrical reflector. A light beam enters the conical, cylindrical reflector through a hollow shaft of a motor. An illuminated portion of an object is imaged on an array of photosensitive elements to produce corresponding signals that are representative of the image on the array of photosensitive elements. A conical beam is produced which may be used in a robotic mapping function.

U.S. Pat. No. 4,611,811 describes an optical apparatus for scanning radiation over a surface. The apparatus includes a plurality of optically spaced rotating arms extending from a central axis. A central reflector is positioned at the axis of the arms, and a radially remote reflector is positioned at the axis of the arms. The central reflector rotates with the arms but is sequentially indexed into optical path alignment with each radially remote reflector so that a beam of radiation in the optical path is scanned over the same predetermined arcuate segment by each of the three remote reflectors. The axial reflectors do not need to be positioned equidistant from the axis of rotation of the arms.

BRIEF DESCRIPTION OF THE INVENTION

The present optical scanning technique provides a unique solution to the problem of imaging and scanning over large format images while effecting high speed exposure and high resolution data. The process may be applied to any of the various disciplines in which scanned image data acquisition is known, and may be desirably applied to imaging techniques using ultraviolet, visible and IR wavebands. The present method overcomes many of the limitations described above using the unique combination of rotational scanning with multi-channel imaging. Further objects and advantages of this new technique are to provide new methods used in pattern or data scanning with equally high data rate and high resolution, simply by reversing the direction of light propagation.

The present invention includes a scanning optical system for the recording of an flat image on a substrate using a plurality of writing channels, the method comprising:

a) rotating said flat image about an axis perpendicular to said substrate (which in turn is parallel to the resulting flat image);

b) scanning said substrate with a photosensitive layer thereon (with the photosensitive layer preferably being parallel to said substrate) with a multi-channel exposure head while said substrate is rotating about said axis; and c) moving said multi-channel exposure head parallel to said substrate while said substrate is rotating.

The scanning of the substrate (and, of course, the photosensitive layer on the photosensitive element) may be performed on a transparent holding frame or on a photosensitive element having a transparent substrate or having multiple photosensitive layers (e.g., two-side photographic emulsion coated substrate, multilayers of photographic emulsions on the same or opposite sides of a transparent substrate, with emulsion layers sensitive to the same wavelengths or different wavelengths) by using at least two multi-channel exposure heads, one directed towards a first, front surface of said photosensitive element or substrate surface and another directed towards a second, rear surface of said photosensitive element. By having front and rear exposure heads emitting at different wavelengths, different or complementary or additive images may be generated in the different sensitivity layers by front and rear exposure, or by exposure from the same side of the substrate (whether or not transparent) by locating the different emitting sources at different positions along the rotation of the substrate. The front and rear imaging are preferably performed simultaneously and in register. The method and apparatus also show significant benefits with only a single multi-channel exposure head exposing the photosensitive element with image data directed towards only one surface of the rotating substrate carrying the photosensitive element.

An apparatus and system for practicing this method are also described. In one aspect, a two-side coated photosensitive element on a transparent holding frame or a one-side coated or two side coated photosensitive element on a transparent substrate may be supported in a rotatable frame with the photosensitive surface(s) of the photosensitive element being exposed. Opposed multi-channel exposure heads may be simultaneously focused in register on the opposite surfaces of the transparent image (or on the same photosensitive layer if multiple or overlapping exposures are desired for purposes of exposing different layers with different spectral sensitivities or providing overlapping exposures to improve imaging speed and/or increase image density, respectively), the support for the transparent image is rotated about an axis so that the transparent image moves within a single plane which passes between the two multi-channel exposure heads. The support may be, for example, a platen with a non-eccentric shape (to reduce any physical wobbling or vibration) such as a round, elliptical, square, or other symmetrical shape or rotationally stable shape.

DETAILED DESCRIPTION OF THE INVENTION

Figure 1:
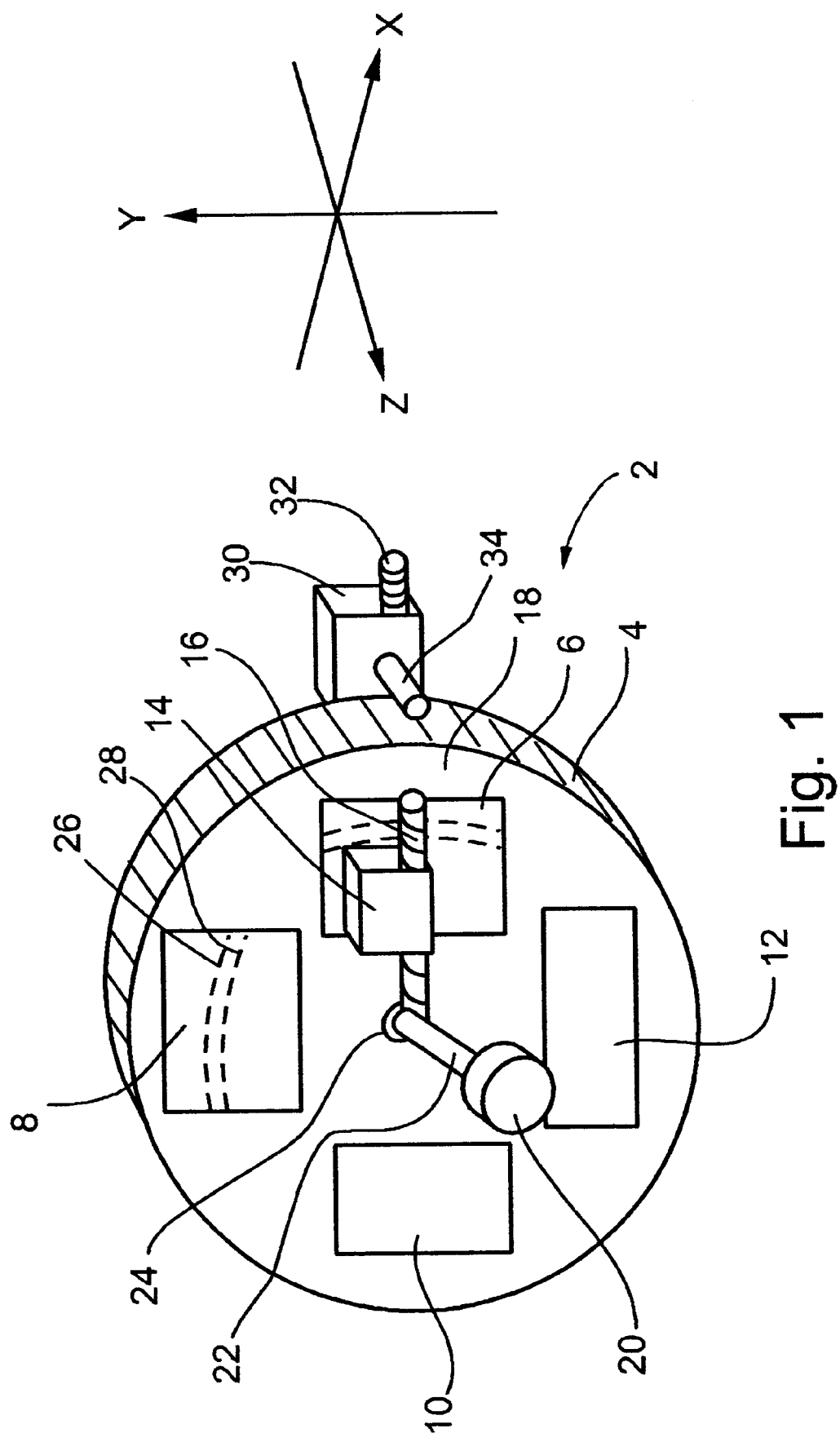
FIG. 1 shows a perspective view of an image scanning system according to one aspect of the present invention.

The optical image data scanning system of the present invention may be generally summarized as comprising a rotating imageable surface (e.g., the holding frame, photosensitive element, and/or support for the photosensitive element) or carrying plane in which the imageable surface remains within the plane of rotation, and an exposure head which remains parallel to the plane of rotation and moves linearly and parallel to the plane or rotation of the image support surface. It is preferred that the image is flat and supported on a platen which rotates in the plane of rotation of the image support surface. The exposure head is supported above the plane of rotation of the image support surface and as the image support surface is rotated, the exposure head translates linearly over the rotating surface and scans the image support surface with an arc with an increasing radius. One or more images may be scanned in sequence on the same platen. The rate of increase of the arc of the scan may be carefully controlled and adjusted to provide the degree of resolution desired.

The invention may be described as a scanning optical system for the recording of an image on a flat substrate, comprising:
  a. a rotating support which rotates about an axis perpendicular to the plane of the support or substrate (the image support surface);
  b. at least one exposure head capable of scanning the surface of the rotating substrate (e.g., the photosensitive element carried on the rotating substrate), the exposure head capable of moving along a line parallel to the plane of the rotating substrate.

The scanning optical system may have at least one exposure head comprises a multi-channel exposure head, and in one aspect of the invention may comprise at least two exposure heads, the at least two exposure heads sandwiching the plane of the substrate. The scanning optical system may have the rotating support contain a radiation-sensitive imageable material maintained in a flat orientation on the rotating support. The scanning optical system may also be described as a system where the substrate has a radius measured perpendicular to the axis perpendicular to the plane of the substrate, the exposure head provides an exposure area at a focal point on the substrate of maximum dimension R as measured along the radius, and movement of the exposure head is controlled to a degree that with any rotation of the substrate, each movement of the exposure head along a line parallel to the plane of the substrate moves the exposure area so that the exposure area remains at a focal point on the substrate along the radius at a distance from the center of rotation of the substrate which should remain less than or equal to R. After any one rotation of the substrate while said substrate is being scanned, the exposure head is moved linearly, and the movement is a linear movement, preferably at a distance along the radius which is less than or equal to R. Where there are at least two exposure heads sandwiching the plane of said substrate, after any one rotation of said substrate while said substrate is being scanned, the exposure heads are each moved linearly, and movement for the two exposure heads is also a linear distance which is preferably along the radius (the path of movement of the focal point of the emitted radiation along a stationary rotatable substrate would move along an axis, the exposure heads moving parallel to a radius on a stationary rotatable substrate or platen) which linear distance is preferably less than or equal to R. By having the distance of movement less than or equal to R, the area of exposure is maintained within the boundaries of the surface of the rotating support.

The exposure head may also be moved at a continuous speed during rotation of the platen. The swath created in this format would be a helix. By maintaining constant speed of linear movement of the exposure head and a constant speed of rotation of the platen, uniform spacing between the lines of the scanning can be effected, with uniform spacing between all lines as measured along any radius of the rotating platen.

A process for imaging a photosensitive element with radiation from an exposure head according to the present invention comprises:
  a) supporting a photosensitive element on a support so that all portions of the photosensitive element to be exposed to radiation are outside of a center of rotation of the support,
  b) exposing the photosensitive element with radiation from the exposure head with radiation to which the photosensitive element is sensitive while rotating the support, a line of the exposure forming an arc with a radius R1 on the photosensitive element, moving the exposure head linearly and parallel to a surface of the photosensitive element so that a subsequent line of exposure of the photosensitive element forms an arc with a radius that is different in size than R1. The photosensitive element may be on a transparent substrate, the photosensitive element on a transparent substrate (or a two-side photosensitive layer coated element with an opaque support layer intermediate the two photosensitive layers) may be supported between two surfaces which are each transparent to radiation to which the photosensitive element is sensitive. Where there are at least two exposure heads which sandwich the support, and each of the exposure heads may expose the photosensitive element during rotation of the support, preferably with the two exposure heads are in register with each other and simultaneously expose the photosensitive element during rotation of the support. Although the two heads may also be in register but exposure the photosensitive layer(s) at different times at the same exposure point.

The process is applicable with, for example without limitation, a photosensitive element selected from the group consisting of photographic elements, photothermographic elements, photoresist elements, thermal mass transfer and thermal dye transfer elements, photopolymerizable elements, phototackifiable elements, vesicular media, optical recording disks, optically readable disks, ablative recording elements, photodetackifiable elements, positive acting photosolubilizable elements, and photohardenable elements.

A system is also provided for inspecting printed circuit boards comprising:
  a. A large disc platen capable of holding at least one printed circuit board and rotating the printed circuit board around an axis perpendicular to a plane (usually the major plane defined by the length and width of the board) of the board; and
  b. At least one multi-channel camera positioned on at least one side of the printed circuit board, which camera translates across the board to facilitate fall inspection coverage of the board. This is preferably done with at least two multi-channel cameras simultaneously, inspecting both surfaces of the board in register with each other.

A system capable of both writing and scanning printed circuit boards is also described which comprises:
  a. a disc platen capable of holding at least one printed circuit board on a surface of the platen and rotating the platen around an axis perpendicular to a plane of the board;
  b. at least one multi channel camera positioned on at least one side of the printed circuit board,
  c. a support for the multi-channel camera which translates the multi-channel camera over a surface of the board, obtaining images for use in viewing the boards; and
  d. at least one multi-channel exposure head from the at least one side of the printed circuit board, which multi-channel exposure (e.g., emitting or writing) head translates over the surface of the board to expose a photosensitive material on a surface of the board.

This system may use at least two multi-channel cameras and at least two exposure heads simultaneously, inspecting and exposing both surfaces of the board in register with each other.

FIG. 1 shows an embodiment of the apparatus of the present invention. The imaging data scanning system 2 comprises a platen 4 carrying four flat imageable elements or finished images 6, 8, 10 and 12 thereon. The four flat imageable elements 6, 8, 10 and 12 may be provided as completely different images (four separate images, one on each of the four imageable elements) or two or more may be identical images. At least one exposure head 14 (which may be for example a multi-channel exposure head) is positioned over a surface 18 of the platen 4. The exposure head is shown to be supported on a lead screw assembly 16 which allows the exposure head 14 to move along a line parallel to the surface 18 of the platen 4 and therefore move along a line which remains parallel to the four flat imageable elements 6, 8, 10 and 12. A drive system or motor 20 is connected to a support shaft 22 which could engage end 24 of the lead screw assembly 16 to rotate the lead screw 16 assembly and move the exposure head 14 along the lead screw assembly 16 in a path which remains parallel to the surface 18 of the platen 4. Two concentric scan paths 26 and 28 are shown on one of the flat imageable elements 8. Because the two concentric paths 26 and 28 are concentric, they can be aligned to abut each other or merge with each other without any gaps forming between the scan paths. An optional arrangement for the apparatus of the present invention, either where a second distinct imageable element is provided on the back side of the platen 4 or where at least one of the imageable materials is to be exposed from both of its sides (e.g., by having two distinct photosensitive layers on opposite sides of a substrate or by having a single layer multiply exposed from the front and rear through a transparent substrate) is to have at least a second exposure head 30 on a second lead screw 32. This combination of second exposure head 30 and second screw assembly 32 enables the second exposure head 30 to move in a linear path which maintains the second exposure head 30 parallel to the surface of the back side (not shown) of the platen 4 and the flat surface features of the photosensitive layer, the image and/or the imageable element (not shown) on the back side of the platen 4. The optical exposure element 34 of the second exposure head 30 is also shown.

The combination of the drive system and system which moves the exposure heads over the surface 18 of the platen 4 must be able to move the exposure head 30 smoothly, uniformly and precisely to maintain the image quality. A screw lead system 16 is actually the preferred mechanism, but any other motivation system such as a hydraulic system, pneumatic system, electrical motor system, magnetic drive, mechanical screw (or even manual screw) system, and the like may be used to cause the exposure heads (e.g., 16 and 32) to translate parallel to image surfaces of the platen 4. It is desirable that the control of the progression of the exposure head be able to be within dimensions smaller than at least the largest spot size for the light source. Screw systems are commercially available in which there can be as many as 20,000 controllable positions within each centimeter of linear movement of the screw assembly. This would provide a line-to-line resolution of 2,000 lines per millimeter of 1000 line pairs per millimeter. Systems which provide resolution of at least 100 lines per millimeter or between 100 and 2000 lines per millimeter are acceptable for practice of the present invention. Screw systems also tend to have reduced vibration during movement so as to minimize any such effect on resolution during translation of the exposure head over the image surface.

Figure 2:
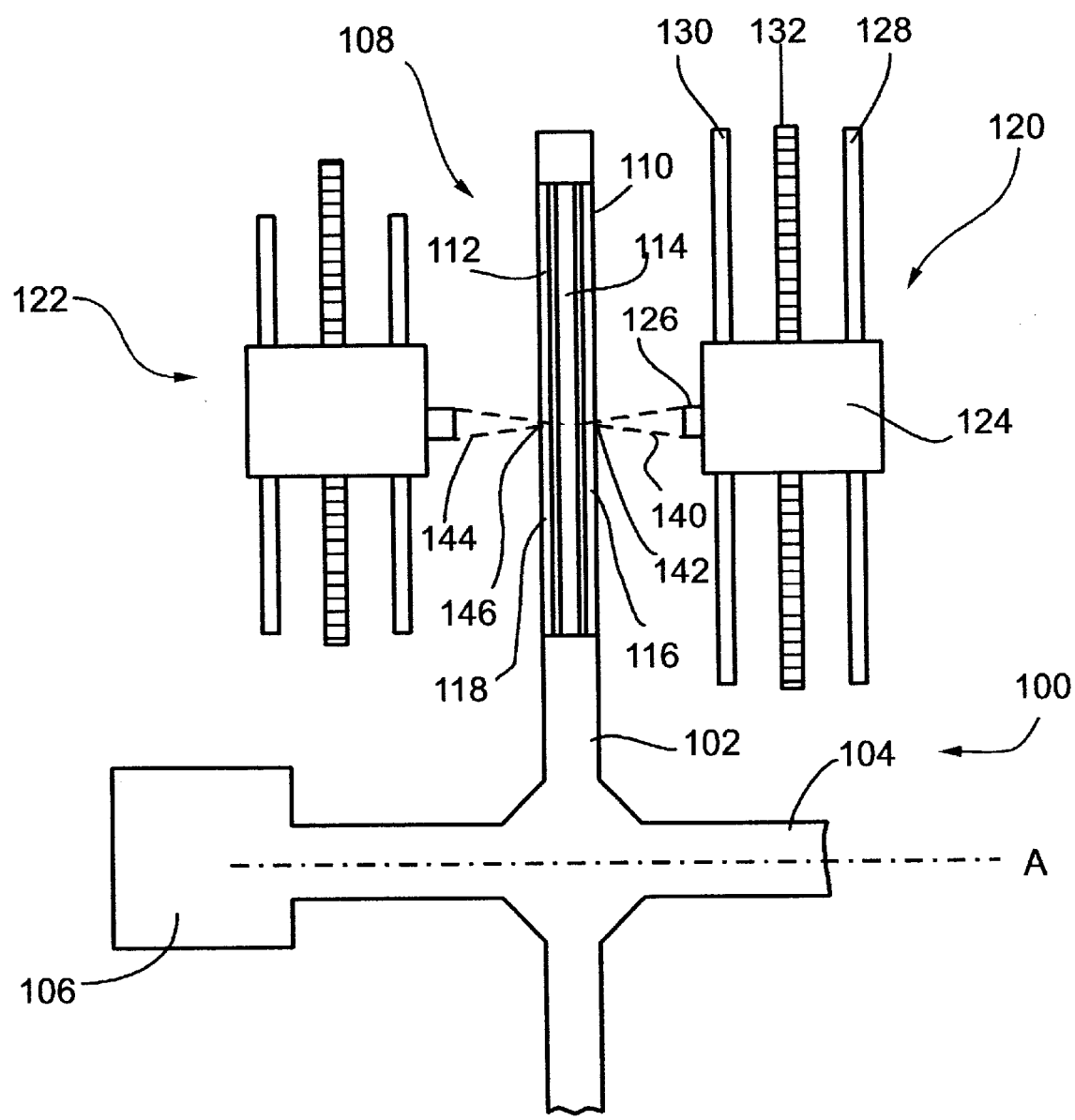
FIG. 2 shows a side view of a rotational data acquisition system according to the present invention with two exposure heads exposing simultaneously both sides of working plane.

FIG. 2 shows a cutaway top view of an image scanning system of the present invention. A rotating platen 102 is shown. A drive shaft 104 for rotating the rotating platen 102 is shown with its axis of rotation A. The cutaway view shows one extended length 108 of the platen 102 which contains two transparent cover plates 110 and 112 which act to allow radiation (e.g., light, UV and/or infrared radiation, depending upon the imaging system) to pass through them to expose image data onto the photosensitive imageable element 114 between the two transparent cover plates 110 and 112. Spacing or gaps 116 and 118 are shown between the transparent cover plates 110 and 112 and the optionally transparent imageable element (the photosensitive element) 114, but the gaps 116 and 118 are merely shown for convenience. In actual operation, the transparent cover plates 108 and 110 would press against the transparent imageable element 114 to assure that the photosensitive element and layers lay flat within the extended arm portion 108 of the rotating platen 102. Two exposure head systems 120 and 122 are shown on opposite sides of the rotating platen 102. The exposure head 124 is shown with its optical element 126 directed towards the optionally transparent imageable element 114. The exposure head 124 is guided along two guide tracks 128 and 130 which guide the exposure head 124 as it translates by rotation of the lead screw 132. The focus of the radiation 140 from the optical element 126 in exposure head 124 is shown to be directed towards the surface 142 of the optionally transparent imageable element 114. The focus would be on the actual center of depth of the image forming material on the photosensitive element 114 which could be at one or both surfaces 142 and 146 of the photosensitive element 114 or could be in the center of the photosensitive element 114. The focus of the radiation 144 from the second exposure head 122 is shown directed at the surface 146 of the transparent image 114 merely for convenience. As with the focus 140 of the first exposure head 124, this focus 144 would best be directed towards the center or a surface of the actual image rather than just the surface 146 of the element carrying the transparent image.

In accordance with the present invention, it is desirable that a flat rotating disk has at least one and preferably two multi-channel imaging exposure heads moving along a radial axis of a rotating disk. It is also desirable to have the two exposure heads move parallel to each other in symmetry on opposite sides of the rotating platen.

FIG. 1 illustrates a general operating principle of a rotational scanning image recording method and apparatus. The said system essentially comprises a disk platen 4, a motor 20, an exposure head 14, and at least one working plane 6 (e.g., a recording medium). In FIG. 1, the working plane 6 is laid flat on the disk platen 4 and both are parallel to the X-Y plane. The disk platen 4 rotates around the Z axis, driven by motor 20. The exposure head 14 is shown imaging a swath of plurality of channels 26 and 28 onto a working plane 8. The plurality of channels 26 and 28 may be oriented in-line with the translation axis of the exposure head 14. As the disk platen 4 rotates about the Z axis, different subregions along a circular are recorded on the working planes or images 6, 8, 10 and 12. As the image is recorded on the working planes, the exposure head 14 translates along X axis, moving approximately radially with respect to the platen 4 and relatively perpendicularly to the rotational axis Z of the platen 4, in synchronization with the rotation of the disk platen 4. The exposure head 14 does not have to be positioned along a line parallel to a radius on the platen 4, but for convenience sake and simplicity of design and software, this is conveniently done. The entire image is recorded onto working plane 6 by rotating the disk platen 4 carrying the working planes 6, 8, 10 and 12 while simultaneously translating the exposure head 14 along a radial axis until all the area of the working planes 6, 8, 10 and 12 is covered. The data to be recorded is in the form of electrical signal fed into a modulating device (not shown) in the exposure head. The working planes 6, 8, 10 and 12 can be any recording medium (e.g., photographic film, thermographic, photothermographic, electrophotographic image or a PCB panel coated with photoresist). This image recording method provides a large field-of-view, high resolution and very high data rate and it can use visible, UV, IR, soft x-ray, or x-ray wavelength bands. In addition, an autofocus system can be incorporated into the imaging system to compensate for any variations in the flatness of the working plane. The front optics piece of the exposure head 14 comprises the final imaging optics which also serves as the focus compensation. The relatively small and light weight optical module can track any changes in the distance from the optical element to the working plane (the surface or plane on which the emitted light is focussed, the surface or center of a photosensitive layer), keeping the beam in focus, maintaining constant spot size and energy density.

Since the exposure head carries out the linear translation whereas the working planes are always rotated about a constant point (the center of rotation of the platen), this system provides a significant or even complete solution to the rotational scanning distortion associated with other rotational scanning systems. Accordingly, this method is particularly suitable for use with multi-channel exposure heads wherein each single path swath may be arbitrarily wide. The circular arc shaped region imaged the exposure head onto working plane is shown in FIG. 1 following a double pass of the rotating disk platen. The translation direction of the exposure head is indicated by the axis X. The width of the circular arc is related to the size of the image patch size produced by the plurality of channels in the exposure head. The translation velocity (the speed of movement of the exposure head along the X axis) should be such that consecutive image scans are perfectly adjacent to each other or overlap to produce a complete reproduction of the imaged pattern plane. As previously noted, the translational speed of the exposure head and the rate or rotation of the platen may be maintained at uniform speeds and the spacing between adjacent scans may be maintained at precise and identical radial distances (i.e., the spacing between any two helical arms at any point along the helix, when measured along a straight line from the center of rotation of the helix, will always be the same, irrespective of the angle of rotation of the straight line from the center of rotation).

Furthermore, the current invention works with any type of imaging medium, either flexible or rigid, and can image both sides simultaneously. Thus, this system benefits from drum based imaging system advantages of high speed imaging without being limited to any particular type of exposure medium. In addition, by positioning more than one photosensitive element on a single surface 18 of a rotating platen 4, data may be imaged for more than one photosensitive element (e.g., 6, 8, 10 and 12) and the image data merely separated by a processing system (e.g., a computer). This can greatly increase the speed of the system by handling more than one image while a single platen is rotating.

FIG. 2 illustrates an alternative realization of the recording system. In this system, two exposure heads are used, one on either sides of the disk platen, such that the recording medium at the working plane can be recorded simultaneously on its two sides. The two exposure heads' line-of-sights may be pre-aligned to each other, to any desired degree of precision, carrying this precise alignment onto the exposed medium as an immediate back-to-front image register. The hold down of the working plane (surface or center of the photosensitive element or a photosensitive layer) to the disk platen can be achieved in several ways. One method is to place the recording medium between two plates, which are transparent to the writing wavelength. Another method is to tension the recording medium by clamps holding the medium by the edges. A variation of the second method is using the centrifugal force as the tensioning force on one edge.

In accordance with the above discussion, it can be readily appreciated that the image recording method contemplated in this invention can find many applications in various areas, such as high quality photographic reproductions, graphic-arts, the manufacturing of Printed Circuit Boards (PCB), the manufacturing of flat panel displays (e.g., active matrix liquid crystal displays), etc. In addition, the image recording method contemplated in this invention can provide many features which cannot be accomplished with other methods. Furthermore, the proposed image recording method has the following additional advantages:

It can provide large field-of-view and high resolution at the same time;

It can achieve very high exposure rates with only modest rotation speed of the disk platen;

It can incorporate an exposure head with an autofocus system to compensate for variation in the surface flatness of the pattern plane and working plane;

It can work with multi channel exposure head having arbitrarily high number of simultaneously written channels, hence enabling extremely high imaging speeds; and It can expose the two sides of a working plane simultaneously, thus achieving immediate back-to-front image register.

Certain parameters with respect to the disc platen and the resolution and imaging features of the optical modules and scanning heads help to illustrate features of the present invention. A resolution of addressability of approximately 4000 dot per inch or 6.35 micrometers will be assumed, with 200 parallel spots in each multi-channel exposure head. A plate (rotating substrate) size of approximately 18 inches by 24 inches (35.7 cm by 60.9 cm) is used, with four printing plates laid on plateaus. A one minute total imaging time is used (with approximately 2 Gbit/second input data rate per exposure head). The higher data rate is required to account for the fact that imaging may occur only in about half of the rotation time due to the partial coverage of the platen.

Figure 3:
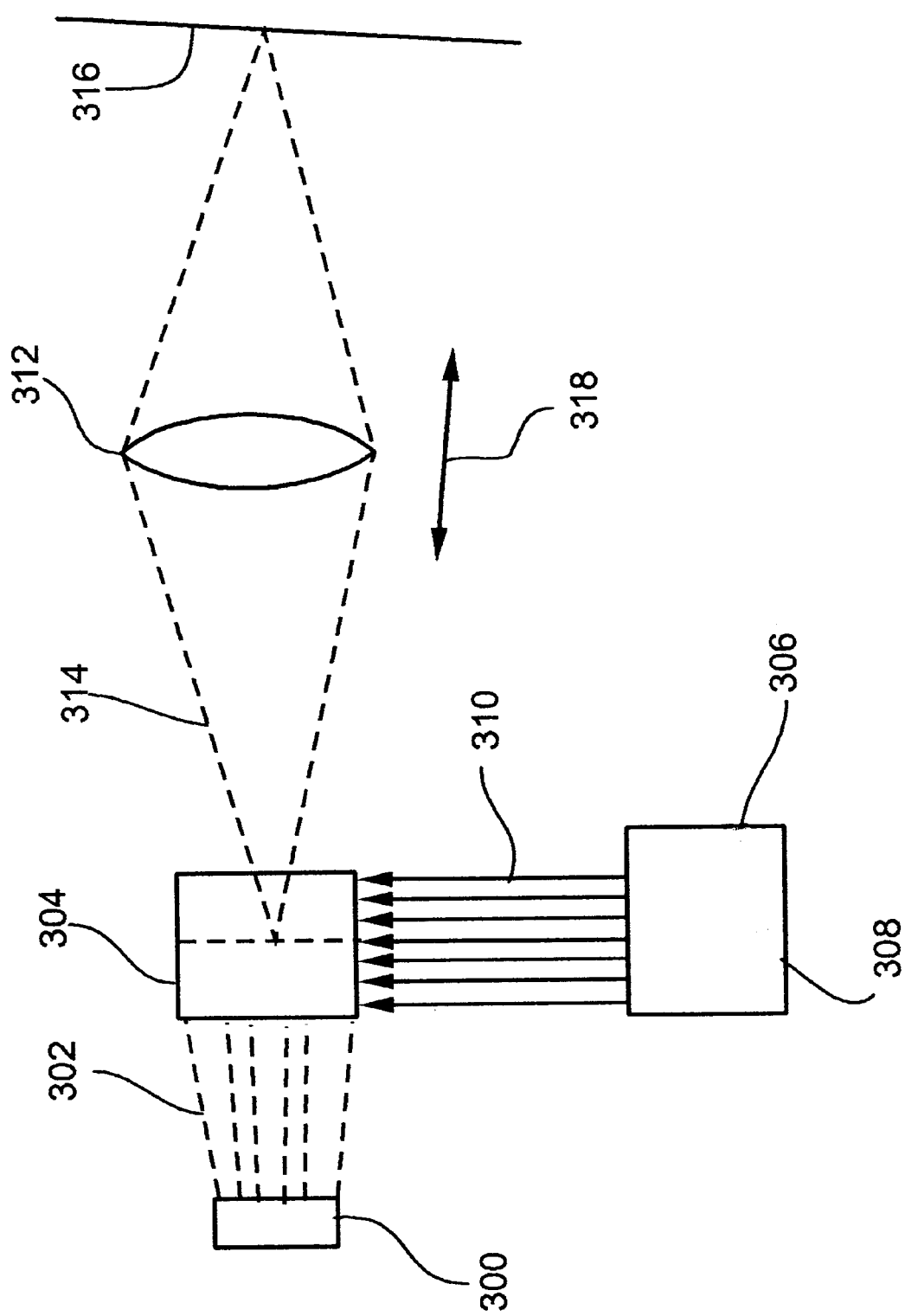
FIG. 3 shows a schematic of a multi-channel exposure head.

FIG. 3 shows a schematic configuration of a multi-channel exposure head. A light source 300 provides illuminating radiation 302 on a multi-channel light switch 304. The multi-channel light switch 304 is provided with a multi-channel light switch driver 306 into which is fed serial input electronic data 308. This provides a parallel modulation signal 310 to the multi-channel light switch 304. Imaging optics 312 focus emitted light 314 onto an image plane 316. The image optics 312 will usually have an auto focus compensation 318.

Figure 4:
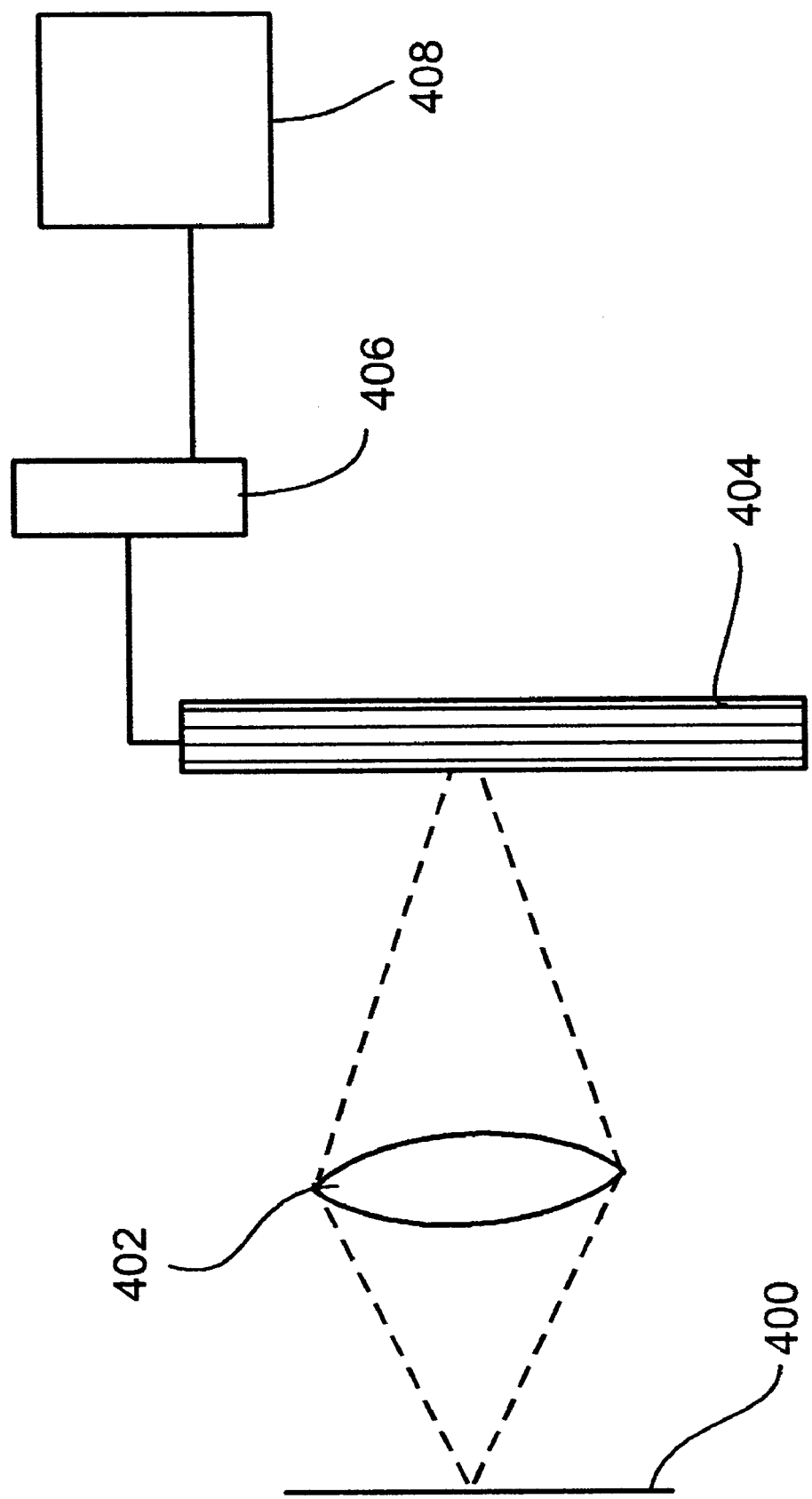
FIG. 4 shows a schematic of a multi-channel camera.

FIG. 4 shows a schematic representation of a multichannel camera. The substrate to be scanned 400 is shown in relationship to the imaging optics 402, a linear CCD element 404, a processing electronics package 406 and a computer 408. The CCD array 404 may comprise, for example only, 128 to 1024 or more elements for resolution.

Figure 5:
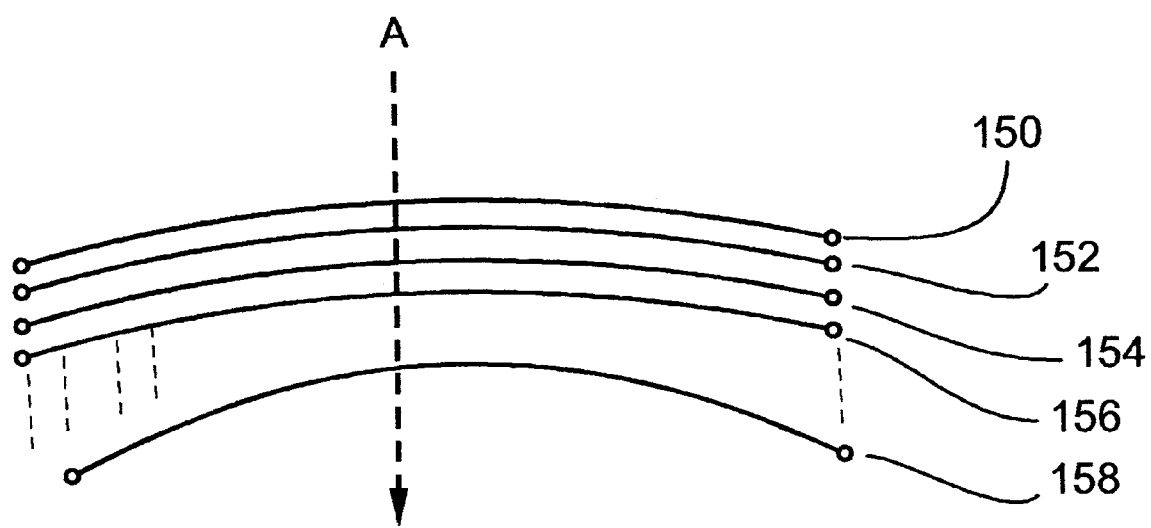
FIGS. 5 and 6 show a prior art scan pattern.

The swath pattern is shown in FIG. 5, with the secondary scan direction shown by arrow A. Each of the passes 150, 152, 154, 156 and 158 in the scan pattern is shown as the resultant segment of concentric circles from the rotation of the platen, as opposed to the displaced segments of same diameter circle patterns produced and shown in FIG. 4.

The swath size for this example (between channel 1 and 200) is the 6.35 micrometers times the 200 channels, or 1.27 mm. The number of pixels per secondary scan direction size is approximately 72,000 pixels. The number of swaths at 200 pixels per swath is 360 swaths. With the exposure head moving in the secondary scan direction, one swath per revolution, the plates must rotate at about 360 revolutions per minute. The effective imaging time for one side of a plate is therefore about 15 seconds. The effective double sided imaging rate is about 240 plates per hour (with two opposite exposure heads), excluding loading and unloading time for the plates. The platen diameter for this exemplary system is about 1.74 meters.

The rotation of the disk and other parameters within the practice of the present invention may be varied within significant ranges, and specific values or measurements given in examples or general descriptions are not to be considered as limiting in the practice of this invention. For example, the rate of rotation of the disk may be generally varied between 50 to 1000 revolutions per minute, and the spot size may vary upon the addressibility or resolution desired or enabled for the system. For resolution of about 4000 dots per inch (approximately 1600 dots per centimeter), the dot size might be ordinarily chosen within a general range of 6 to 15 micrometers (e.g., between 6.4 and 13 micrometers), for a resolution of 5000 dots per inch (approximately 2000 dots per centimeter), the dot size might be chosen within a general range of 4 to 12 micrometers (e.g., 5 to 10 micrometers), and the like. The available resolution range of the system can be quite broad, as for example from 3,000 to 10,000 dots per inch or more (1200 to 4000 dots per centimeter or more). The linear translation speed of the exposure head is usually about one swath per revolution, so the linear translation speed is highly dependent upon the rate of rotation of the disk or platen. An approximate general range of exposure head translation speed is between about 10 and 250 mm/second, preferably between 15 and 150 mm/seconds with the actual systems which have been most particularly described in the practice of the present invention.

Figure 6:
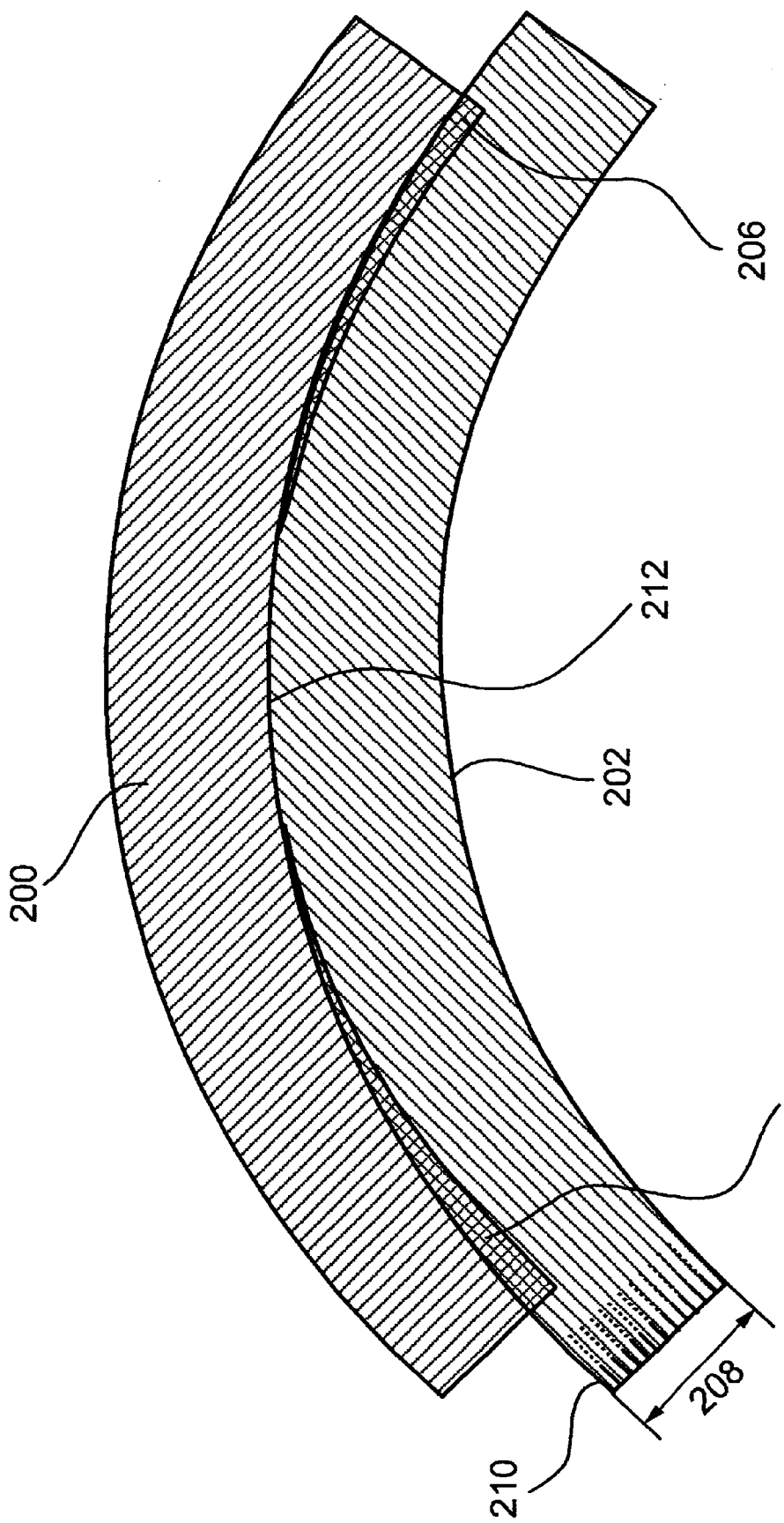

A more detailed view of a swath according to the prior art is shown in FIG. 6. A first swath 200 is followed by a second swath 202. Because the radius of curvature of both swaths 200 202 remains the same, with the object plane moving rather than the exposure head (not shown), there are regions of overlap 204 206 when a central portion of the swaths 200 202 abut at a point 212. The width 208 of the second swath 202 is shown, as is the multichannel effect 210 on a truncated portion of the second swath 202. The abutting point 212 is effected by translating the object plane under a fixed arc exposure head one swath width 208 to assure that each scan covers the entire available imageable surface.

It is understood by those of ordinary skill in the art that the electronic data which enters the system, usually provided in rectangular raster form, is converted into circular scanning compatible data by commercially available or readily programmable scan converter electronics.

Although the description above contains many specifics, these should not be construed as limiting the scope of the invention but as merely providing illustrations of some of the presently available or preferred embodiments of this invention. For example, different kinds of exposure heads can be used to achieve the recording operation; different recording media layouts can be used to manifest different productivity rates; different types of autofocus systems can be employed; etc.

What is claimed is:

1. A scanning optical system for the recording of an image on a flat substrate supporting a radiation-sensitive imageable material, the scanning optical system comprising:
   a. a rotating support which rotates about an axis perpendicular to the plane of said flat substrate;
   b. the radiation-sensitive imageable material having a sensitivity to radiation;
   c. at least one exposure head capable of exposing the radiation-sensitive imageable material supported on said flat substrate, said at least one exposure head capable of moving along a line parallel to the plane of said rotating substrate to image a photographic, photothermographic, photoresist, photopolymerizable, phototackifiable, or photosolubilizable radiation-sensitive imaging material; and
   d. a camera for receiving radiation to inspect imaging performed on said radiation-sensitive imageable material while said flat substrate is rotating.

2. The scanning optical system of claim 1 wherein said at least one exposure head comprises a multi-channel exposure head.

3. The scanning optical system of claim 1 wherein there are at least two exposure heads, said at least two exposure heads sandwiching the plane of said flat substrate, each of said at least two exposure heads moving along a line parallel to the plane of said flat substrate to image a photographic, photothermographic, photoresist, photopolymerizable, phototackifiable, or photosolubilizable radiation-sensitive imaging material.

4. The scanning optical system of claim 2 wherein said rotating support supports a radiation-sensitive imageable material in a flat orientation on said rotating support.

5. The scanning optical system of claim 3 wherein:
   a. said substrate has a radius measured perpendicular to said axis and parallel to the plane of said flat substrate,
   b. said exposure head provides an exposure area at a focal point on said flat substrate of maximum dimension R as measured along said radius, and
   c. movement of said exposure head is controlled to a degree that with any rotation of said flat substrate, each movement of said exposure head along a line parallel to the plane of said flat substrate moves said exposure area at a focal point on said flat substrate along said radius by a distance less than or equal to R, and a multi-channel camera is positioned over said surface of the imageable material to read information on said surface to inspect imaging results.

6. The scanning optical system of claim 5 wherein after any one rotation of said flat substrate while said flat substrate is being scanned, said exposure head is moved linearly, and said movement is a linear distance along said radius which is less than or equal to R.

7. The scanning optical system of claim 5 wherein there are at least two multi-channel exposure heads, said at least two exposure heads sandwiching the plane of said flat substrate.

8. The scanning optical system of claim 7 wherein after any one rotation of said flat substrate while said substrate is being scanned, said exposure heads are moved linearly, and movement for said two exposure heads is a linear distance along said radius which is less than or equal to R.

9. The scanning optical system of claim 8 wherein said at least two exposure heads are symmetrically aligned in register with each other.

10. A scanning optical system for the recording of an image on a flat substrate comprising a photosensitive material, the system comprising:

a a rotating support which rotates about an axis perpendicular to the plane of said flat substrate; and b at least one exposure head capable of exposing the photosensitive material on said flat substrate, said exposure head capable of moving along a line parallel to the plane of said flat substrate wherein the photosensitive material is held flat on said flat substrate by pressure provided by two flat surfaces, at least one of which two flat surfaces allows transmission of radiation to which the photosensitive element is responsive.

11. The scanning optical system of claim 1 wherein said rotatable support has said at least one exposure head supported by a lead screw which is able to move in a line parallel to a surface of said support.

12. A system capable of both writing and scanning printed circuit boards comprising:

a a disc platen capable of holding at least one printed circuit board on a surface of the platen and means for rotating the platen around an axis perpendicular to a plane of said board;

b at least one multi-channel camera positioned on at least one side of the printed circuit board;

c a support for said multi-channel camera which translates the multi-channel camera over a surface of the board, obtaining images for use in viewing said board; and d at least one multi-channel writing head from said at least one side of said printed circuit board, which multi-channel writing head translates over said surface of the board to expose a photosensitive material on a surface of said board; and said at least one multi-channel camera positioned over the surface of the platen to receive radiation and to inspect results of imaging.

13. A system as in claim 12 using at least two multi-channel cameras and at least two exposure heads simultaneously, inspecting and exposing both surfaces of said board in register with each other.

14. The system of claim 12 wherein more than one printed board is held on the disk platen.

15. The system of claim 12 wherein the printed circuit board is rectangular.

* * * * *